(12) United States Patent
Zaetterqvist

(10) Patent No.: US 10,495,424 B2
(45) Date of Patent: Dec. 3, 2019

(54) MAGAZINE, CARTRIDGE AND METHOD FOR VARIABLE PROJECTILE CLUSTER DENSITY OF A COUNTERMEASURE

(71) Applicant: SAAB AB, Linkoeping (SE)

(72) Inventor: Christer Zaetterqvist, Uppsala (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/301,170

(22) PCT Filed: May 5, 2017

(86) PCT No.: PCT/SE2017/050440
§ 371 (c)(1),
(2) Date: Nov. 13, 2018

(87) PCT Pub. No.: WO2017/200458
PCT Pub. Date: Nov. 23, 2017

(65) Prior Publication Data
US 2019/0178613 A1    Jun. 13, 2019

(30) Foreign Application Priority Data

May 17, 2016   (SE) ...................................... 1650665
Nov. 8, 2016   (SE) ...................................... 1651466

(51) Int. Cl.
*F41A 27/00* (2006.01)
*F42B 5/15* (2006.01)
(Continued)

(52) U.S. Cl.
CPC .................. *F42B 5/15* (2013.01); *B64D 1/02* (2013.01); *B64D 7/00* (2013.01); *F41A 21/42* (2013.01);
(Continued)

(58) Field of Classification Search
CPC . F42B 5/15; F42B 12/70; F41H 11/02; B64D 1/02; B64D 7/00; F41A 27/08
(Continued)

(56) References Cited

U.S. PATENT DOCUMENTS 2,391,956 A    1/1946   Eastman
2,467,514 A    4/1949   Woodman
(Continued)

FOREIGN PATENT DOCUMENTS

DE    3902624 A1    8/1990
EP    0253028 B1    8/1990
(Continued)

OTHER PUBLICATIONS

International Searching Authority, International Search Report and Written Opinion for International Application No. PCT/SE2017/050436, dated Jul. 21, 2017, 12 pages, Swedish Patent and Registration Office, Sweden.
(Continued)

*Primary Examiner* — Michael D David
(74) *Attorney, Agent, or Firm* — Alston & Bird LLP

(57) ABSTRACT

A magazine for storing and launching countermeasures arranged in cartridges, comprising a plurality of longitudinal cartridge cases forming the magazine, where the magazine comprises a tilting means adapted to tilt the cartridge cases, such that the openings of the cartridge cases can be directed in a selected direction, and where a countermeasure comprises multiple projectiles, and where the magazine is adapted to launch a first countermeasure and a second countermeasure, where the projectile cluster density of the first countermeasure is lower than the projectile cluster density of the second countermeasure. The advantage of the
(Continued)

invention is that a countermeasure can be directed towards an incoming object and can be adapted for the distance to the object before it is launched.

16 Claims, 6 Drawing Sheets

(51) Int. Cl.
| | | |
|---|---|---|
| *B64D 1/02* | (2006.01) | |
| *B64D 7/00* | (2006.01) | |
| *F41H 11/02* | (2006.01) | |
| *F41A 21/42* | (2006.01) | |
| *F41F 1/08* | (2006.01) | |
| *F42B 12/70* | (2006.01) | |
| *F41F 7/00* | (2006.01) | |

(52) U.S. Cl.
CPC .............. *F41F 1/085* (2013.01); *F41H 11/02* (2013.01); *F41F 7/00* (2013.01); *F42B 12/70* (2013.01)

(58) Field of Classification Search
USPC ........... 89/37.16–37.22, 37.01, 37.02, 41.14; 102/505
See application file for complete search history.

(56) References Cited

U.S. PATENT DOCUMENTS

| | | | |
|---|---|---|---|
| 3,808,595 A | 4/1974 | Coop et al. | |
| 4,280,394 A | 7/1981 | Singenberger et al. | |
| 4,674,393 A | 6/1987 | Schaulin et al. | |
| 5,198,609 A | 3/1993 | Gillman | |
| 6,231,002 B1 | 5/2001 | Hibma et al. | |
| 7,640,858 B1* | 1/2010 | Herbage | C06B 21/0041 102/336 |
| 2001/0015126 A1 | 8/2001 | Grunewald | |
| 2003/0117309 A1 | 6/2003 | Pappert et al. | |
| 2005/0204910 A1* | 9/2005 | Padan | B64D 1/04 89/1.813 |
| 2010/0294119 A1 | 11/2010 | Buechler et al. | |
| 2012/0210855 A1 | 8/2012 | Clark et al. | |
| 2019/0092469 A1* | 3/2019 | Zaetterqvist | F41F 1/085 |
| 2019/0137220 A1* | 5/2019 | Zaetterqvist | F42B 5/155 |

FOREIGN PATENT DOCUMENTS

| | | |
|---|---|---|
| EP | 1194331 B1 | 5/2004 |
| EP | 2157398 A2 | 2/2010 |
| EP | 2421754 B1 | 10/2016 |
| GB | 2410542 A | 8/2005 |
| GB | 2505721 A1 | 3/2014 |
| WO | WO 2010/123422 A1 | 10/2010 |

OTHER PUBLICATIONS

International Searching Authority, International Search Report and Written Opinion for International Application No. PCT/SE2017/050440, dated Jul. 21, 2017, 12 pages, Swedish Patent and Registration Office.

International Searching Authority, International Search Report and Written Opinion for International Application No. PCT/SE2017/050437, dated Jul. 21, 2017, 12 pages, Swedish Patent and Registration Office.

International Searching Authority, International Search Report and Written Opinion for International Application No. PCT/SE2017/050441, dated Jul. 21, 2017, 13 pages, Swedish Patent and Registration Office.

International Searching Authority, International Search Report and Written Opinion for International Application No. PCT/SE2017/050442, dated Aug. 4, 2017, 14 pages, Swedish Patent and Registration Office.

* cited by examiner

MAGAZINE, CARTRIDGE AND METHOD FOR VARIABLE PROJECTILE CLUSTER DENSITY OF A COUNTERMEASURE

CROSS REFERENCE TO RELATED APPLICATIONS

This application is a National Stage Application, filed under 35 U.S.C. § 371, of International Application No. PCT/SE2017/050440, filed May 5, 2017, which claims priority to Swedish Application No. 1650665-1, filed May 17, 2016, and Swedish Application No. 1651466-3, filed Nov. 8, 2016; the contents of all of which are hereby incorporated by reference in their entireties.

BACKGROUND

Related Field

The present invention relates to a magazine adapted for launching at least two countermeasures, where the projectile cluster density of the at least two countermeasures are different, and where the firing direction of a countermeasure can be controlled. The countermeasure is comprised in an active protection system and is of a hard-kill type.

Description of Related Art

Arrangements for storing and launching payloads, such as countermeasures, which are designed to be mounted on aircrafts, are previously known. One such arrangement is a dispenser mounted on an aeroplane, which comprises an elongate body provided with at least one launch opening. The countermeasures are connected to a firing control unit for feeding firing signals to the countermeasures. The countermeasures can consist of passive means, such as chaff foil, but can also consist of for example IR flares, or other active measures. The countermeasures are stored in one or more magazines, where a magazine comprises a plurality of cartridges, with one countermeasure in each cartridge.

One problem with known dispensers mounted on aircrafts is that the launch angle of a countermeasure is fixed to a set angle which is believed to be optimal for the intended use. Depending on the purpose of the countermeasure, it may be of advantage to use different firing directions. If chaff is released, a preferred launch direction may be upwards towards a helicopter, if flares are released, a preferred launch direction may be somewhat forwards and downwards. A dispenser mounted on an aeroplane may therefore be provided with several magazines, directed in different directions. A solution with a fixed launch angle may be a good solution for an aeroplane, which has a known flight direction and a known speed range.

For a helicopter, a fixed launch angle is however not optimal, since both flight angle, flight speed and the orientation of the aircraft may vary considerably. Helicopters may be provided with several magazines holding cartridges with countermeasures. Each magazine may be positioned at a predefined position and pointing in a predefined direction on the helicopter, such that several magazines will cover a larger firing range.

However, in some situations, a magazine may be directed in a direction that is not usable for a specific situation. With a magazine having a fixed position, it may in some situations be possible to steer the helicopter such that a desired firing direction of a countermeasure is obtained. Further, by using a magazine having a fixed position pointing in a fixed direction, the types of countermeasures that can be used is limited to countermeasures that does not require a high precision of the launch direction.

A further problem may also be that the countermeasure that is to be launched in a desired direction is optimized for a specific range, i.e. that the object that the countermeasure is launched at should be at a predefined distance in order for the countermeasure to function properly. In some situations, it may be difficult to point in a desired direction at an exact moment in time, in order to be able to launch the countermeasure when the object is in sight and at the right distance.

The known solutions will in some situations allow for firing a countermeasure in a desired direction at a predefined moment in time. Even though these arrangements may give an acceptable result in some cases, there is room for improvements.

BRIEF SUMMARY

One object of the present invention is to at least partially eliminate the drawbacks associated with the solutions known in the prior art. Another object is to provide a magazine adapted to launch countermeasures having different projectile cluster densities and where the launch angle can be controlled.

Another object of the invention is to provide an aircraft comprising such a magazine.

The solution to the problem according to the invention is described in the characterizing part of claim 1. Claim 13 refers to an inventive cartridge adapted to be used in a magazine. Claim 14 refers to an advantageous method for launching a countermeasure. The other claims contain advantageous embodiments and further developments of the magazine, the cartridge and the method.

In a magazine for storing and launching countermeasures arranged in cartridges, comprising a plurality of longitudinal cartridge cases forming the magazine, where the cartridge cases are arranged to each other in a slidable manner in a longitudinal direction, where the magazine comprises a tilting means adapted to tilt the cartridge cases, such that an opening of a cartridge case can be directed in a selected direction, the object of the invention is achieved in that a countermeasure comprises multiple projectiles, and where the magazine is adapted to launch a first countermeasure and a second countermeasure, where the projectile cluster density of the first countermeasure is lower than the projectile cluster density of the second countermeasure.

By this first embodiment of the magazine according to the invention, a magazine is provided, in which the cartridge cases of the magazine can be tilted in a desired direction and where a plurality of countermeasures having different projectile cluster densities can be launched. The projectiles are preferably made from metal, and preferably a heavy metal such as lead, steel, tungsten or bismuth. The projectiles may also be made from a synthetic or ceramic material. When mounted on an aircraft, the magazine is preferably tilted in a selected angle in dependency of an active position sensor comprised in a tracking system of the aircraft, in order to be able to launch the countermeasure in the desired direction. When mounted on a vehicle or on the ground, the selected angle depends on the direction to an incoming threat. The actual projectile cluster density of a countermeasure is selected in dependency of the distance to an incoming object. In this way, it is possible to launch a countermeasure having a relatively high projectile cluster density if the incoming object is relatively far away, and to launch a countermeasure having a lower projectile cluster density if the incoming object is closer. By varying the projectile cluster density in dependency of the distance to the incoming object, the likelihood of hitting the incoming object with a sufficient amount of projectiles will increase.

By using the same projectile cluster density for all distances, the projectile cluster density would be too low for an object relatively far away. If the projectile cluster density is lower than required, an incoming shell or grenade will not detonate since too few projectiles will hit the shell. The projectile cluster density of consecutive countermeasures can be varied in different ways. One possibility is to use countermeasures with fixed chokes having different diameters. A countermeasure having a choke with an appropriate diameter can then be launched at a selected moment. Another possibility is to use countermeasures with an adjustable choke. The choke can then be adjusted to a desired diameter before the countermeasure is launched.

Preferably, two or more countermeasures are launched consecutively, with a time delay between each launch corresponding to the speed of the incoming object. One advantage of launching the countermeasures one and one is that the maximal recoil force acting on the magazine is minimized, such that the recoil force from one countermeasure can be absorbed before the next countermeasure is launched.

The selected angle of the countermeasures depends on the direction of motion of the aircraft and on the relative azimuth and elevation angle to an incoming threat. A helicopter preferably carries several magazines, such that all angles of the helicopter can be covered. When mounted on a vehicle or on the ground, the selected angle depends on the direction to an incoming threat.

The magazine or the aircraft comprises a tracking system having an active position sensor. The active position sensor is adapted to detect the position of an incoming object, e.g. a passive shell launched from a handheld shell launcher. Such a shell does not emit any active signals such that it can be detected by a passive sensor. The active position sensor is preferably a radar or a lidar which sends out a signal and detects and analyses the reflected response signal. The active position sensor will detect the position of the incoming object and will also be able to detect the distance to the incoming object. The position and distance signal from the active position sensor is transferred to an electronic control unit (ECU) positioned in the magazine or in the aircraft. The electronic control unit is adapted to control the direction of the cartridge cases such that the opening of a cartridge case can be directed towards the incoming object. The electronic control unit will further control the desired projectile cluster density of the countermeasure that is to be launched.

It is also possible to use the magazine on ground, either mounted on a vehicle or mounted in a stationary way on ground. When mounted on a vehicle, the tracking system may be comprised in the vehicle, and when mounted on the ground, e.g. on a stand or a tripod, the tracking system may be a stand-alone system or the tracking system may be integrated in the magazine.

In another example, the magazine is provided with countermeasures comprising projectiles having different diameters. One countermeasure may e.g. comprise projectiles having a diameter of 2 mm and another countermeasure may comprise projectiles having a diameter of 4 mm. The countermeasure having projectiles having a greater diameter is adapted to be used for objects relatively far away, while the countermeasure having projectiles with the smaller diameter is adapted to be used for objects at a closer distance.

One advantage of the inventive magazine is that the openings of the cartridge cases can be directed towards an incoming object, and that the countermeasure that is to be launched can be adapted for the distance to the incoming object. By being able to point directly towards an incoming object and to optimize the projectile cluster density to the distance to the incoming object, it is possible to use countermeasures that can disarm or destroy the incoming object. Normal countermeasures can only disturb active incoming objects but have no effect on passive incoming objects. The inventive magazine will allow e.g. a helicopter, a vehicle or a ground base to protect itself from passive shells in an efficient and cost-effective way.

The electronic control unit that controls the tilting of the magazine, the launch of a countermeasure and the projectile cluster density of the countermeasure may be positioned in the magazine or may be integrated in an external control system, e.g. in an aircraft or a vehicle. It is also possible that the control of the tilting of the magazine, i.e. the tracking of an incoming object, is performed by an electronic control unit arranged in the magazine, and that the launch of a countermeasure and the control of the projectile cluster density of the countermeasure is controlled by an external electronic control unit arranged in e.g. an aircraft or a vehicle. By both controlling the tilting of the magazine, the launch of a countermeasure and the projectile cluster density of the countermeasure by an electronic control unit arranged in the magazine, an autonomous track and launch system is obtained, which is able to detect and destroy an incoming object. Such a solution is especially advantageous for a ground mounted arrangement, where a magazine is mounted on a stand or a tripod. With an autonomous system comprised in a magazine, there is no need to connect the magazine to an external control system.

When an incoming object is detected by the tracking system, the cartridge cases are tilted in the direction of the incoming object, i.e. such that the centre axis of a cartridge case points in the direction of the incoming object. A fine tracking function of the tracking system will then continuously follow the incoming object and will continuously fine adjust the tilt angle of the cartridge cases to point directly at the incoming object. The fine tracking function will further continuously track the distance to the incoming object and will continuously adapt the projectile cluster density of the countermeasure to the actual distance. When the incoming object reaches a predefined position and distance in relation to the magazine, at least two countermeasures having different projectile cluster densities may be launched directly towards the incoming object in order to eliminate and destroy the incoming object. The countermeasure comprises a plurality of small metal projectiles which will cause the incoming object to detonate. The small metal projectiles may be spherical or multifaceted.

Depending on the speed of and angle to the incoming object, it is also possible to point the cartridge cases with an offset angle, such that the cartridge cases are directed to a position in front of the incoming object. This will compensate for the time delay between the launch of a countermeasure until the countermeasure reaches the incoming object.

The tracking system of e.g. an aircraft is adapted to detect and follow an incoming object. The tracking system will in such an example be provided with an active position sensor such as a radar or lidar. It is also possible to integrate a vision system in the tracking system. A vision system can be used to identify the type of the incoming object and also to detect the position and speed of the incoming object. This will further improve to ability to adapt the projectile cluster density of the countermeasure to the type of the incoming object. A vision system may also be used to detect objects on the ground, such that a hostile detected object can be eliminated by launching e.g. a shell or the like. The tracking system may be integrated in the magazine. The active position sensor may be integrated in one or more cartridge cases in the magazine, or may be positioned on the outside of the magazine.

When the tracking system detects an incoming object and a countermeasure is to be launched in a direction detected by the tracking system, the cartridge cases are tilted to an active position, pointing in the desired launch direction. The preferred launch direction for a helicopter depends of the incoming threat, but is often to the rear of the helicopter. It is however of advantage to be able to direct the cartridge cases in a sideway direction or in a forward direction, since a helicopter may hover or fly in any direction. There are of course limitations for the possible tilting angle, but it is preferred that a cartridge case can be tilted in a first direction both forwards and rearwards by at least 30 degrees, and more preferably by at least 45 degrees. Further, it is of advantage that a cartridge case can be tilted in a second direction both forwards and rearwards by at least 30 degrees, and more preferably by at least 45 degrees. For a ground use, the preferred launch direction may e.g. be determined by sensors adapted to detect motion in the surroundings. Such a sensor may be a radar or a vision system.

The magazine is operated and tilted by at least one actuator, which is controlled by an electronic control unit. In one example, an input signal to the ECU may be a direction signal, which gives a desired pointing direction for a cartridge. A further input signal is a distance signal, which gives the distance to an incoming object. The direction signal and the distance signal may be obtained from an active position sensor. The input signals may also take account of the actual flight direction of the aircraft when the magazine is mounted on an aircraft, such that the launch angle of a countermeasure can be adapted to the actual elevation and azimuth of the aircraft, especially if the aircraft flies with a relatively high speed.

The cartridge cases are arranged adjacent each other in a slidably manner, such that the cartridge cases may be tilted. In this way, the openings of the cartridges can be directed in the desired direction. The cartridge cases are adapted to be tilted forwards and backwards in a first direction. Preferably, they are also adapted to be tilted forwards and backwards in a second direction. The cartridge cases comprises in one example longitudinal interconnection means arranged in parallel with the centre axis, where adjacent cartridge cases are interconnected to each other in a slidable manner. The interconnection means may e.g. comprise longitudinal grooves and tongues interconnecting adjacent cartridge cases.

A cartridge case is advantageously provided with a square or rectangular cross-section. In this case, the interconnection means preferably extend on a plurality of the longitudinal external sides of the cartridge case. A cartridge case could also be provided with another cross-sectional shape, for example a round or polygonal shape. Depending on the cross-sectional shape, the interconnection means preferably extend on at least one external side of each cartridge case such that adjacent cartridge cases can be interconnected to each other.

The cartridge cases of a magazine are arranged to be tilted by a tilting means in a desired angle, e.g. with reference to the direction of motion of the aircraft or with reference to the mounting position of the magazine, such that the openings of the cartridges can be directed in the desired direction. The cartridge cases are adapted to be tilted from a first position to a second position. The first position may e.g. be a resting position and the second position may be an active position. In this description, the directions will be defined as follows, where directions relating to a helicopter are used. The forward direction of the aircraft is approximated as a direction with the nose pointing forwards, and being in the horizontal plane, i.e. floor and the rotor of the helicopter are parallel to the horizontal plane. The horizontal plane comprises a forward horizontal direction, i.e. the direction of motion of the helicopter, and a sideway horizontal direction, i.e. perpendicular to the forward horizontal direction. The vertical direction is defined as being perpendicular to the horizontal plane.

The resting position is typically a position in which the cartridge cases are directed in a first predefined direction. This position preferably represents a most likely launch direction for a countermeasure, such that a countermeasure can be launched without having to tilt the cartridge cases or with a required minimum of tilting. The resting position may also be the centre position of the tilting means, which may be a position in which the cartridge cases are perpendicular to a base plate of the magazine.

The active position is the launch position. In the launch position, the cartridge cases are directed in any possible direction, e.g. between 0-45 degrees forwards or backwards in the first direction and between 0-45 degrees forwards or backwards in the second direction.

The invention also relates to a method for launching a countermeasure from a magazine. The countermeasure is arranged in a cartridge case comprised in the magazine. The method comprises the steps of: launching a second countermeasure having a predefined projectile cluster density, and thereafter launching a first countermeasure having a lower projectile cluster density.

BRIEF DESCRIPTION OF THE FIGURES

The invention will be described in greater detail in the following, with reference to the embodiments that are shown in the attached drawings, in which FIG. 1 schematically shows a side view of an aircraft provided with magazines according to an embodiment of the invention for storing and launching countermeasures, FIG. 2 schematically shows a side view of a magazine according to the invention, FIG. 3 schematically shows a side view of a magazine in an active position provided with cartridges having fixed chokes according to the invention, FIG. 4 schematically shows a cartridge comprising an adjustable choke in a first position according to the invention, FIG. 5 schematically shows a cartridge comprising an adjustable choke in a second position according to the invention, and FIG. 6 schematically shows another example of an adjustable choke in a first position.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, forward, rearward, sideway, etc. refer to directions of an aircraft flying forwards in a normal orientation. For a magazine used on ground, directions may also be referred to as forward, rearward, sideway, left, right, etc.

Figure 1:
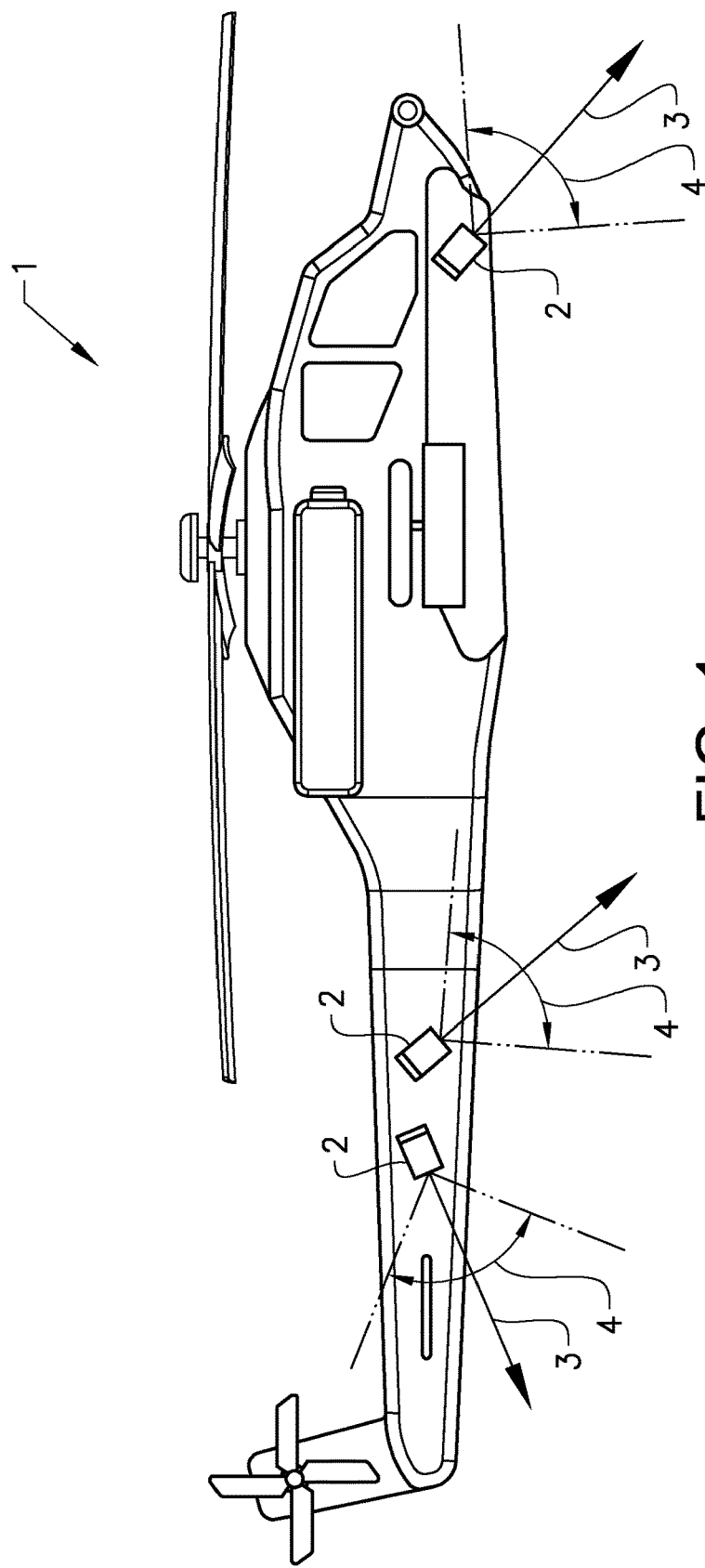

An aircraft 1 in the form of a helicopter, shown in FIG. 1, is provided with several magazines 2 for storing and launching payloads, hereinafter described as countermeasures 5. The magazine may be mounted on aircrafts, on ground vehicles and may also be mounted in a stationary manner on a ground stand. The magazine 2 comprises a plurality of cartridge cases 6, see FIG. 2, which are longitudinal and where a cartridge case is adapted to store and launch a countermeasure. An arrow 3 designates the direction of launching from a magazine 2. The possible launch sector is denoted with 4. In the example shown in FIG. 1, one magazine 2 is placed at the front of the helicopter, pointing forwards-downwards, and two magazines 2 are placed at the rear of the helicopter, where one magazine point forwards-downwards and one magazine point rearwards-downwards. The other side of the helicopter comprises similar magazines. The aircraft further comprises a tracking system adapted to detect and track an incoming flying object, e.g. a shell from a handheld shell thrower.

Since the helicopter may hover or may fly upwards, downwards, forwards or sideways and with varying speeds, the desired launch direction will also depend on the actual flight direction of the helicopter as well as on the relative azimuth and elevation angle to an incoming object. The launch direction will also depend on the actual mounting position on the helicopter. Preferably, several magazines are mounted in different positions on a helicopter in order to cover different launch directions. In this way, it will be possible to launch countermeasures in most directions from the helicopter, such that the flight direction of the helicopter is not important in order to direct the countermeasure to a desired position.

A magazine 2 is described in more detail with reference to FIG. 2 and FIG. 3. In one example, the described magazine is adapted to be used on an aircraft and in the described example, a helicopter is used as an example of an aircraft. The magazine may also be used on ground, and may be mounted on a vehicle such as a landing craft, a truck or a battle tank, or may be mounted in a stationary position on the ground, e.g. by the use of a stand or a tripod. The magazine is preferably directed in a main direction from which the magazine can be tilted to a desired direction, e.g. when a moving object has been detected. In this way, one or a few magazine can be used to cover a large area. By tilting the magazine also in a vertical direction, the elevation angle of a countermeasure can be controlled. In the described example, the magazine is mounted on a helicopter.

The magazine 2 comprises a plurality of cartridge cases 6 arranged in a matrix with a number of rows and a number of columns. A suitable number of rows may e.g. be 4-8 and a suitable number of columns may e.g. be 5-12, depending on the size of a cartridge. A cartridge case is designed with a longitudinal body, preferably having a square or rectangular cross-section. The cross-section of a cartridge may e.g. be 11 or 1*2 inches and the length may e.g. be 8 inches. A cartridge case is adapted to receive a countermeasure 5 stored in a cartridge 12. The countermeasure cartridge 12 is attached to the cartridge case in a known way. The countermeasure cartridge 12 is further connected to a launch system of the aircraft, comprising a firing control. The countermeasure cartridge may either be connected directly to the launch system of the aircraft, or is connected to an electronic control unit of the magazine, which in turn is connected to the launch system of the aircraft. The interface between the countermeasure cartridge and the electronic control unit of the aircraft may be a mechanical system, which can only launch the countermeasure, or it may be an electrical interface, comprising two way communication between the countermeasure cartridge and the aircraft.

A countermeasure is in this example provided with a plurality of small projectiles or pellets, which may be spherical or may be multifaceted. The projectiles are preferably made from metal, and preferably a heavy metal such as lead, steel, tungsten or bismuth. The projectiles may also be made from a synthetic or ceramic material. The projectiles are launched with a predefined projectile cluster density. Preferably, at least two countermeasures are launched consecutively, having two different projectile cluster densities. The projectile cluster density of consecutive countermeasures can be varied in different ways. One possibility is to use countermeasures with fixed chokes having different diameters. A countermeasure having a choke with an appropriate diameter can then be launched at a selected moment. Another possibility is to use countermeasures with an adjustable choke. The choke can then be adjusted to a desired diameter before the countermeasure is launched.

The actual projectile cluster density of a countermeasure is selected in dependency of the distance to an incoming object and/or of the type of the incoming object. In this way, it is possible to launch a countermeasure having a relatively high projectile cluster density if the incoming object is relatively far away, and to launch a countermeasure having a lower projectile cluster density if the incoming object is closer. By varying the projectile cluster density in dependency of the distance to the incoming object, the likelihood of hitting the incoming object with a sufficient amount of projectiles will increase.

The aircraft, the vehicle or the ground system comprises a tracking system adapted to detect and track an incoming flying object, e.g. a shell from a handheld shell launcher. The tracking system may be positioned in the magazine or in the aircraft and comprises an active position sensor that is adapted to detect the position and speed of an incoming object and the distance to the incoming object. When an incoming object has been detected, the tracking system tilts the magazine in a direction towards the incoming object and a fine tracking function will then continuously follow the incoming object by fine adjusting the magazine direction. In this way, the launch openings of the cartridge cases will be directed towards the incoming object. The tracking system will further continuously track the distance to the incoming object and will determine the required projectile cluster density for the countermeasures depending on the distance to the incoming object. The control system may either select between countermeasures having fixed chokes in order to determine which countermeasure to use, or the system may adjust the choke of a countermeasure having an adjustable choke. The magazine will thus be ready to launch a countermeasure when the incoming object has reached a predefined position and distance.

The tracking system may be integrated in the magazine and the active position sensor may be positioned in a cartridge case in the magazine. It is also possible to position the active position sensor on the outside of the magazine. The active position sensor is adapted to detect and to follow a flying incoming object. A suitable and robust sensor may be a radar, a lidar or a vision system. It is also possible to use one type of sensor for the detection of the position of the incoming object and another sensor for the fine tracking of the incoming object. In this case, the fine tracking function may use an optical system.

The active position sensor is connected to an electronic control unit adapted to control the tilting means of the magazine in dependency of the signal from the active position sensor. When the tracking system detects an incoming object, the electronic control unit will control the magazine to point in the general direction of the incoming object and the fine tracking function will then fine adjust the direction of the magazine to point directly to the incoming object. The electronic control unit is also connected to an external control system, e.g. of an aircraft, and receives information regarding the flight parameters of the aircraft. The electronic control unit will also send information regarding an incoming object to the control system of the aircraft. The electronic control unit will further control the projectile cluster density of a countermeasure that is to be launched.

The magazine 2 comprises a base 7, which is the base of the magazine and is used to mount the magazine to e.g. an aircraft by the use of an attachment means. The base is also used to absorb the recoil force created when a countermeasure is launched. The base will absorb and distribute the created force over the entire base area of the base.

Each cartridge case 6 is attached to the base with a flexible joint 16, e.g. a ball joint, such that the cartridge case can be tilted in two directions. At the bottom of each cartridge case, a recoil plate 8 is arranged which is used to attach each cartridge case to the base through the flexible joint. The recoil plate will also transfer the recoil force from a countermeasure to the base when a countermeasure is launched. A cartridge case 6 is attached to a recoil plate 8 in a removable way, such that a countermeasure cartridge 12 can be inserted in the cartridge case. Since the cartridge cases are interconnected to each other to form the magazine, it is possible that all cartridge cases are removed at the same time as one unit when countermeasure cartridges are to be replaced. The flexible joint of one cartridge case will be arranged at a fixed position and will be mounted to the base in a fixed way. This cartridge case will be referred to as the tilt control cartridge case. This cartridge case will be provided with a tilting means which will tilt the magazine in a desired direction.

A cartridge case 6 comprises a cavity 13, adapted to store a countermeasure cartridge 12 and is provided with an opening 14 at the front of the cartridge case. The countermeasure cartridges 12 are connected to a launch control unit (not shown) for feeding launch signals to the countermeasure cartridges. When a countermeasure has been launched, the countermeasure cartridge can be replaced with a new countermeasure cartridge by removing the remains of the launched countermeasure cartridge from the cartridge case and by inserting a new countermeasure cartridge into the cartridge case.

The base of the magazine is further provided with means that allows the flexible joint of the other cartridge cases to move somewhat along the x-axis and the z-axis. This will allow the distance between two flexible joints to vary. When the cartridge cases are tilted, the flexible joints will have to move slightly away from each other due to the relative geometric change between the cartridge cases. Depending on the required tilt angle for the magazine, it would e.g. also be possible to attach each flexible joint to the base with a resilient means such as rubber. It is important that the flexible joints bear against the base, since the recoil force from the recoil plate is transferred through the flexible joint to the base. Other interconnecting methods are also possible.

Figure 2:
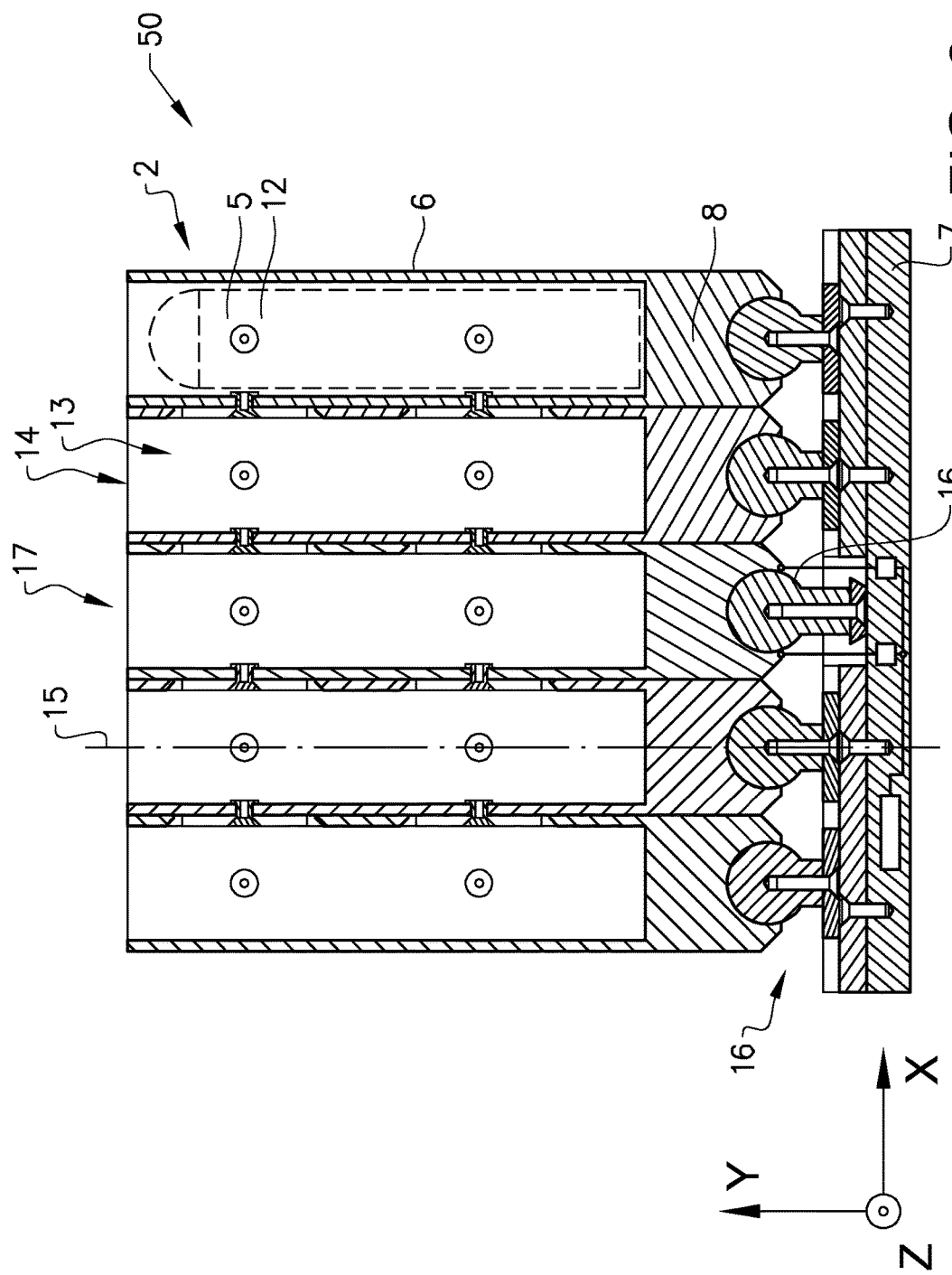

A magazine 2 positioned in a resting or idle position 50 is shown in FIG. 2. In this position, the centre axis 15 of a cartridge case is perpendicular to the base 7. This position is used as a reference position in this description. The tilt angle is zero degrees in the resting position and the centre axis 15 is directed along a y-axis. The recoil base is directed in an x-z plane. The cartridge cases are arranged slidably to each other such that they bear against each other and such that they can slide against each other in the longitudinal direction.

Figure 3:
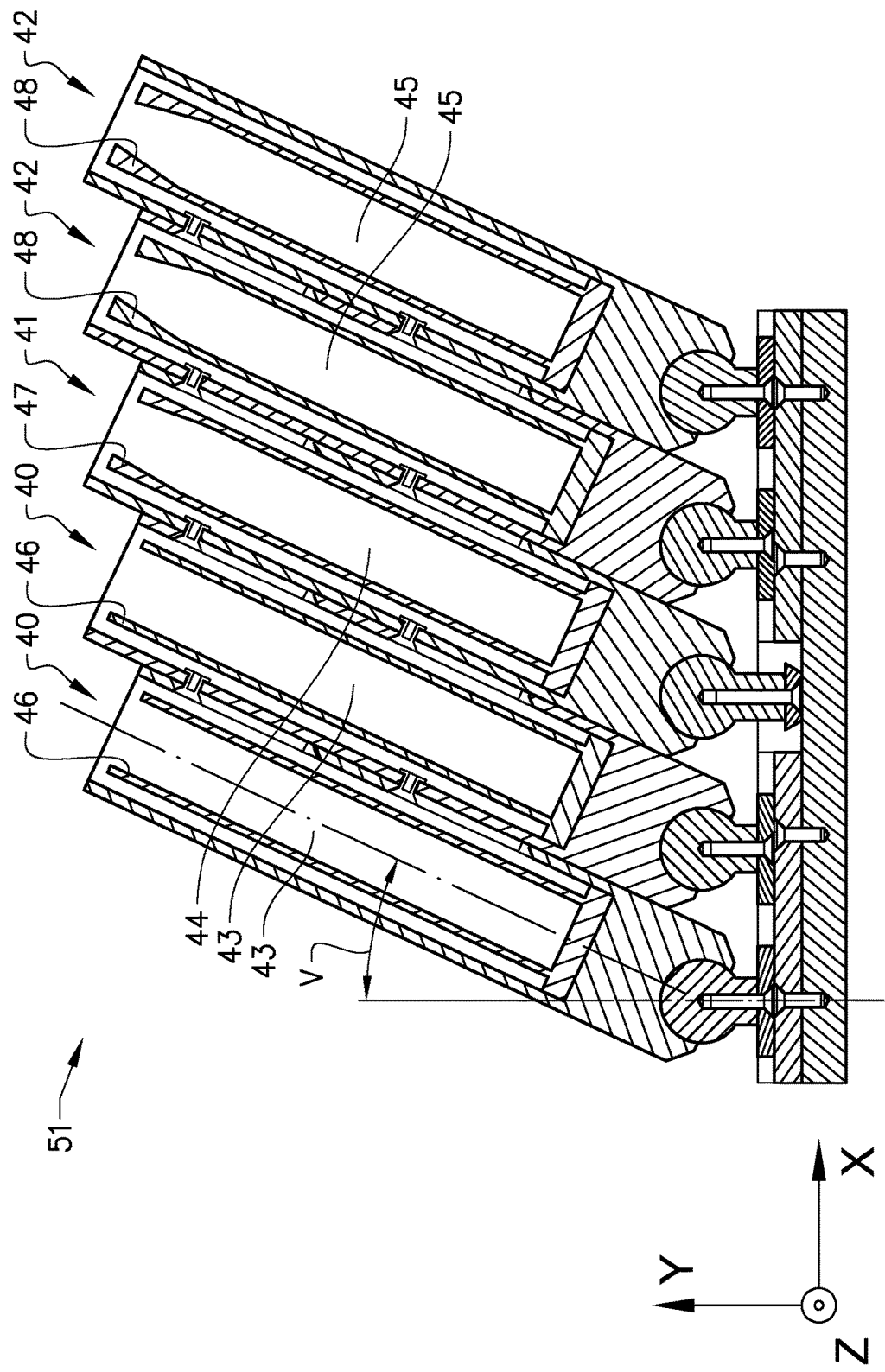

The cartridge cases of the magazine are adapted to be tilted from the resting position 50, shown in FIG. 2, to an active position 51, shown in FIG. 3. Since adjacent cartridge cases are arranged to each other in a slidable manner, the magazine can be tilted by a tilting means to a selected angle. In the description, the selected tilt angle will be relative the resting position. When mounted on an aircraft, the selected angle is preferably referenced to a horizontal and vertical direction of the aircraft, such that the openings of the cartridge cases can be directed in the desired direction.

The magazine 2 shown in FIG. 3 is provided with a plurality of cartridges 12 comprising projectiles, e.g. metallic projectiles. The cartridges in this example are provided with fixed chokes. A first cartridge type 43 is provided with a first fixed choke 46, a second cartridge type 44 is provided with a second fixed choke 47 and a third cartridge type 45 is provided with a third fixed choke 48. These constitute a first countermeasure 40, a second countermeasure 41 and a third countermeasure 42. The diameter of the first choke 46 is the same as the inner diameter of the cartridge. The first choke will thus not affect the projectile cluster density of the cartridge. The diameter of the second choke 47 is smaller than the inner diameter of the cartridge, such that the projectile cluster density of the second cartridge will be affected somewhat. The diameter of the third choke 48 is smaller than the diameter of the second choke, and will affect the projectile cluster density the most. The projectile cluster density of the first cartridge will be the lowest, the projectile cluster density of the second cartridge will be higher than the projectile cluster density of the first cartridge, and the projectile cluster density of the third cartridge will be the highest. In the shown example, three different fixed chokes are shown. It is however possible to use cartridges having chokes with other diameters as well. It is also possible to use several cartridges with adjustable chokes which are set to different desired diameters.

When an incoming object is identified, and the distance to the incoming object is within a predefined range, two or more countermeasures are launched at the incoming object. The control system determines when and which countermeasure is to be launched in order to be able to destroy the incoming object. A countermeasure having a relatively high projectile cluster density is e.g. launched at a first moment when the incoming object is at an outer limit of the range. With a relatively high projectile cluster density, there is a fair chance that enough projectiles will hit the incoming object, which will cause the incoming object to detonate. When the incoming object is closer, a countermeasure having a lower projectile cluster density may be launched. The lower projectile cluster density will give a wider spread of projectiles which will increase the likelihood of hitting the incoming object with enough projectiles. A wider spread of particles is of advantage when the incoming object is closer since the tolerances in aiming and launching will affect the ability to hit exactly at the desired position. Preferably, two, three or more countermeasures having different projectile cluster densities are launched in a consecutive order with a small time delay.

The magazine 2 shown in FIG. 3 is in an active position 51 with the cartridge cases inclined in a first direction. The first direction is directed along the x-axis and the second direction is directed along the z-axis. The y-axis is parallel to the centre axis 15 of a cartridge case when positioned in the resting position. The inclination angle v is chosen depending on the intended use of a countermeasure and the active position may e.g. be directing the cartridges between plus and minus 30 degrees, and preferably by at least plus and minus 45 degrees in a first direction along the x-axis. In the active position, the cartridge cases may also be directed in a second direction along the z-axis, also by e.g. plus and minus 30 degrees, and preferably by at least plus and minus 45 degrees.

One advantage of the inventive magazine is that the openings of the cartridge cases can be directed towards an incoming object. By being able to point directly towards an incoming object, it is possible to use countermeasures that can disarm or destroy the incoming object. Often, countermeasures can only disturb active incoming objects but have no effect on passive incoming objects. The inventive magazine will allow e.g. a helicopter to protect itself from passive shells in an efficient and cost-effective way.

Figure 4:
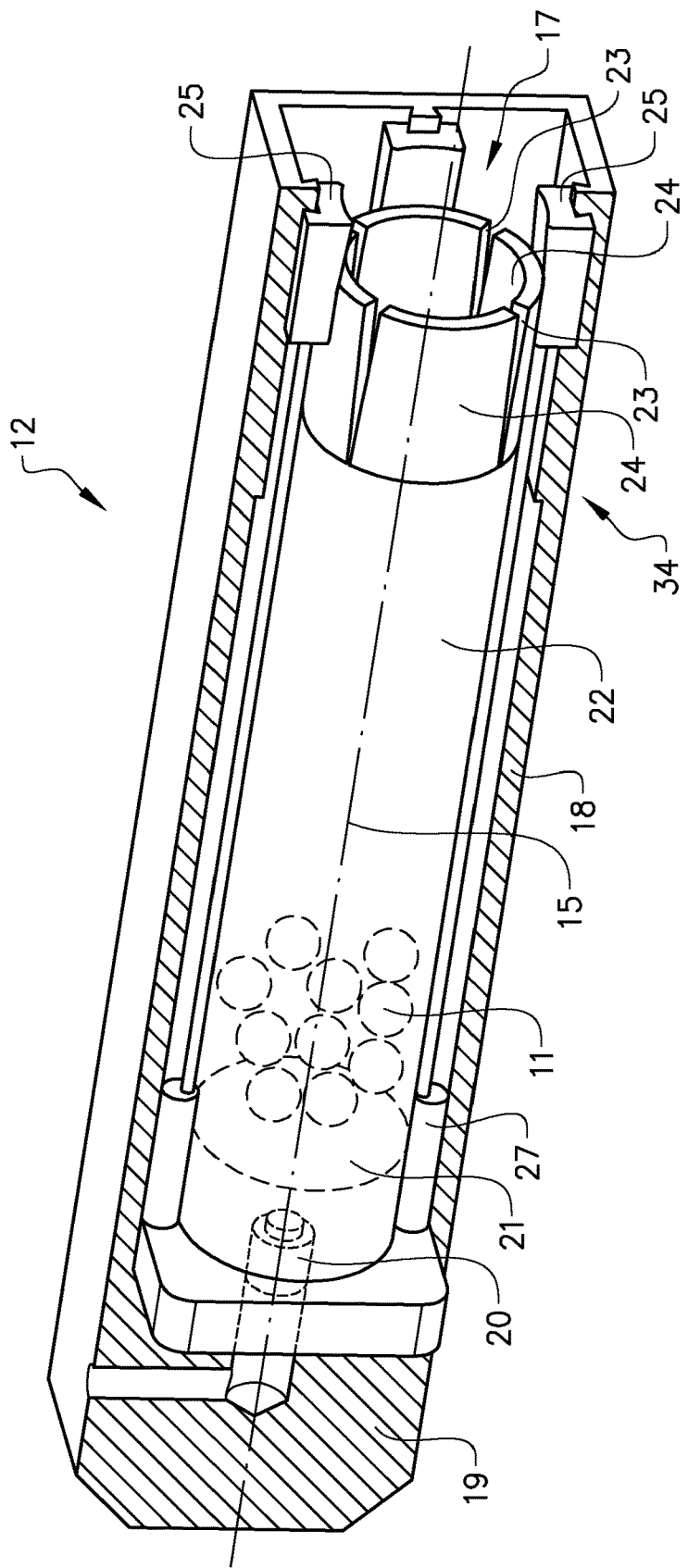

In FIG. 4, a countermeasure cartridge 12 comprising an adjustable choke 17 is shown. The adjustable choke is adapted to change the diameter of the choke, i.e. of the outlet opening of the cartridge. The cartridge is provided with a default projectile cluster density when the adjustable choke is in an unadjusted, idle state. In this state, the diameter of the choke is as large as possible, and the projectile cluster density will thus be as low as possible. This state will correspond to the first fixed choke 46. By adjusting the choke, i.e. by reducing the diameter of the choke, the projectile cluster density will rise.

The cartridge comprises an outer wall 18 which preferably is circular or square, even if other shapes are possible. The outer wall is provided with a bottom 19 which comprises a squib 20 adapted to ignite the explosive charge 21 of the countermeasure. The cartridge further comprises an inner wall 22 housed inside the outer wall. The inner wall is circular and holds the small metal projectiles 11 of the countermeasure 5. The small metal projectiles may be spherical or multifaceted having a diameter of between 1 to 8 mm. The inner wall is preferably made from a metal. The front section 34 of the inner wall is provided with longitudinal slits 23 arranged in parallel to the centre axis 15 of the cartridge, which will create flexible tongues 24 at the front section of the inner wall. The length of the slits is e.g. in the range of ⅓ to 1/10 of the length of the cartridge. The number of tongues is preferably four but could also be six or eight. The width of the slits is such that the tongues will bear against each other when the tongues are in their innermost position.

The cartridge is further provided with wedge-shaped elements 25 arranged between the outer wall and the tongues, at the front section of the inner wall. The wedge-shaped elements are slidable in a direction parallel with the centre axis 15 of the cartridge. FIG. 4 shows a cartridge, where the adjustable choke is at its idle, non-adjusted state. The wedge-shaped element is in a forward position, at the front of the cartridge case, and allows the inner wall to be straight. In this way, the path of the projectiles will be unaffected and the cartridge will resemble a standard cartridge without a choke.

Figure 5:
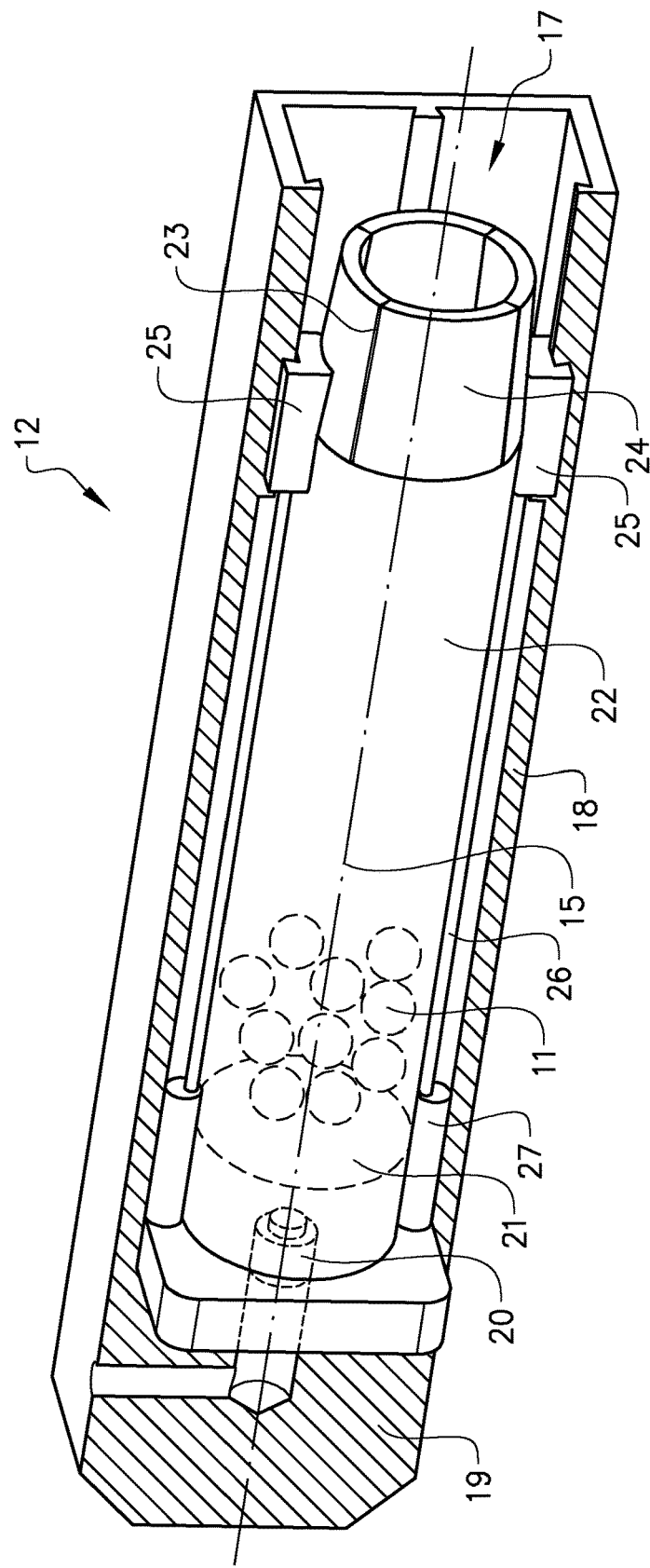

In FIG. 5, a cartridge is shown, where the adjustable choke is in an adjusted state. The wedge-shaped element is here in a rearward position which bends the tongues inwards such that the diameter of the choke is reduced. The projectile cluster density of the cartridge will now be higher when compared with an unadjusted cartridge. The wedge-shaped elements are in this example pulled downwards by an actuator 27 which pulls at a pull rod 26 attached to the wedge-shaped element. The pull rod may be rigid, which is of advantage if the actuator should be able to both pull the wedge-shaped element downwards and to push the wedge-shaped element forwards. If the actuator should only pull the wedge-shaped element downwards, the pull rod may also be flexible. It is also possible to use a flexible pull rod if the wedge-shaped element is pulled forwards by a spring element. The pull rod is arranged between the inner wall and the outer wall, and may be arranged in grooves of the outer wall. The actuator may be positioned at the bottom 19 of the cartridge or may be positioned in the recoil plate 8 of the cartridge case holding the cartridge.

A wedge-shaped element may in one example cover up to a fourth of the circumference of the cartridge opening, and may extend over up to 90 degrees of the opening. The actuator is preferably positioned at the base of the cartridge, in the recoil plate of the cartridge case, and acts on the pull rod through a connection means. It would also be possible to position an actuator at the front of the cartridge which is adapted to push the wedge-shaped element downwards. In another example, the wedge-shaped elements may be combined into a wedge-shaped ring which is provided with a thread and which is arranged between the outer wall and the inner wall. By rotating the ring with an actuator, the wedge-shaped element is moved inwards or outwards.

Figure 6:
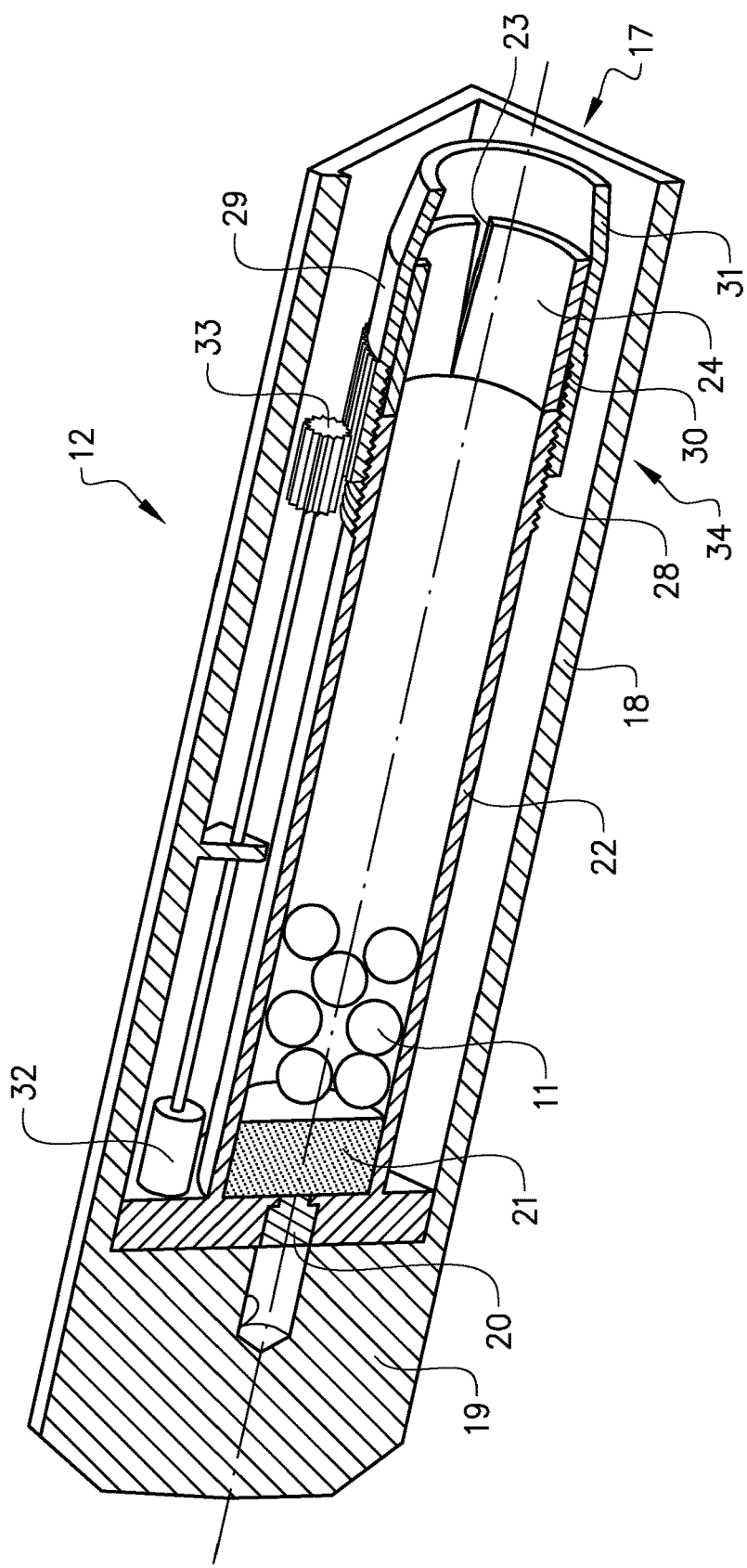

In FIG. 6, another example of a cartridge 12 comprising an adjustable choke 17 is shown, where the adjustable choke is at its idle, non-adjusted state. The cartridge comprises an outer wall 18 and an inner circular wall 22 which is provided with an outer thread 28 arranged at the front section 34 of the cartridge. The inner wall is provided with slits 23 creating tongues 24 at the front section. The cartridge further comprises a sleeve 29 provided with an inner thread 30 adapted to cooperate with the outer thread 28 of the inner wall. The sleeve is provided with a conical front portion 31 which is adapted to affect the tongues 24 when the adjustable choke is in an adjusted state. The sleeve is screwed on the outer wall by the thread.

In FIG. 6, the adjustable choke in an unadjusted, idle state. The sleeve bears on the tongues with the conical front portion, but does not bend the tongues. In this state, the diameter of the choke is as large as possible, and the projectile cluster density will thus be as low as possible. In this way, the path of the projectiles will be unaffected and the cartridge will resemble a standard cartridge without a choke. The opening of the conical front portion is at least as large as the inner diameter of the inner wall, and is preferably somewhat larger.

The adjustable choke of the cartridge is adjusted by rotating the sleeve downwards, such that the conical front portion bends the tongues inwards, thereby reducing the diameter of the adjustable choke 17. The projectile cluster density of the cartridge will now be higher when compared with an unadjusted cartridge. The sleeve is rotated by an actuator 32 which is provided with a toothed wheel 33 which acts on teeth on the outside of the sleeve. The actuator may be positioned at the bottom of the cartridge, at the recoil plate 8 of the cartridge case or may be positioned at the front of the cartridge. When the inner wall is circular and the outer wall is square or rectangular, there is space in the corners of the cartridge case for the actuator.

The adjustable choke can be provided with two positions, one forward, unadjusted position and one rearward, adjusted position. In this case, the adjustable choke is provided with a first position having a first projectile cluster density and a second position, having a second projectile cluster density which is higher than the first projectile cluster density. The two positions are preferably adapted for two different distances to an incoming object. The first position is used for objects that are relatively close, while the second position is used for objects farther away.

The adjustable choke may also be provided with more than two predefined positions, or may be continuously variable between the most forward and the most rearward position. When an incoming object is detected and the distance to the object is determined, the adjustable choke of a cartridge is adjusted for the determined distance before the countermeasure is launched.

When an incoming object is detected by the tracking system of the aircraft, the cartridge cases are tilted in the direction of the incoming object, i.e. such that the centre axis of a cartridge case points in the direction of the incoming object. A fine tracking function of the tracking system will then continuously follow the incoming object and will continuously fine adjust the tilt angle of the cartridge cases to point directly at the incoming object. The distance to the incoming object will also be monitored continuously, such that a countermeasure having an appropriate projectile cluster density can be prepared. The tracking system may comprise an additional fine tracking sensor that is adapted to track a detected object. When the incoming object reaches a predefined position in relation to the aircraft, two or more countermeasures are launched directly towards the incoming object in order to eliminate and destroy the incoming object. By first launching a countermeasure having a relatively high projectile cluster density adapted for a longer distance, and later a second countermeasure having a lower projectile cluster density adapted for a shorter distance, the likelihood of destroying the incoming object is increased.

Depending on the speed of, the angle to and the distance to the incoming object, it is also possible to point the cartridge cases with an offset angle, such that the cartridge cases are directed to a position in front of the incoming object. This will compensate for the time delay when launching a countermeasure until the countermeasure reaches the incoming object.

The tracking system of the magazine is adapted to detect and follow an incoming object. The tracking system will in such an example be provided with an active position sensor such as a radar or lidar. It is also possible to integrate a vision system in the tracking system. A vision system can be used to identify the type of the incoming object and also to detect the position and speed of the incoming object. A vision system may also be used to detect objects on the ground, such that a hostile detected object can be eliminated by launching e.g. a shell or the like.

The invention is not to be regarded as being limited to the embodiments described above, a number of additional variants and modifications being possible within the scope of the subsequent patent claims. The magazine may be mounted to both moving vehicles of all kinds and may also be mounted in a stationary manner, either fixed on e.g. a building or on a movable stand.

REFERENCE SIGNS

1: Aircraft
2: Magazine
3: Direction of launch
4: Launch sector
5: Countermeasure
6: Cartridge case
7: Base
8: Recoil plate
10: Ball joint
11: Projectiles
12: Cartridge
13: Cavity
14: Opening
15: Centre axis
16: Flexible joint
17: Adjustable choke
18: Outer wall
19: Bottom
20: Squib
21: Charge
22: Inner wall
23: Slit
24: Tongue
25: Wedge-shaped element
26: Pull rod
27: Actuator
28: Outer thread
29: Sleeve
30: Inner thread
31: Conical front portion
32: Actuator
33: Toothed wheel
34: Front section
40: First countermeasure
41: Second countermeasure
42: Third countermeasure
43: First cartridge
44: Second cartridge
45: Third cartridge
46: First fixed choke
47: Second fixed choke
48: Third fixed choke
50: Resting position
51: Active position

The invention claimed is:

1. A magazine (2) for storing and launching countermeasures (5) arranged in cartridges (12), comprising a plurality of longitudinal cartridge cases (6) forming the magazine (2), wherein:
the cartridge cases (6) are arranged to each other in a slidable manner in a longitudinal direction,
the magazine (2) comprises a tilting means adapted to tilt the cartridge cases (6), such that an opening (14) of a cartridge case (6) can be directed in a selected direction,
a countermeasure (5) comprises multiple projectiles (11),
the magazine (2) is adapted to launch a first countermeasure (40) and a second countermeasure (41), and
a projectile cluster density of the first countermeasure (40) is lower than a projectile cluster density of the second countermeasure (41).

2. The magazine according to claim 1, wherein the magazine (2) is adapted to launch a third countermeasure (42), wherein a projectile cluster density of the third countermeasure is higher than the projectile cluster densities of the first and the second countermeasure (41).

3. The magazine according to claim 2, wherein the magazine (2) comprises at least two different types of cartridges (43, 44), wherein a first cartridge type (43) is provided with a fixed choke (46) having a first diameter and a second cartridge type (44) is provided with a fixed choke (47) having a second diameter, wherein the first diameter is larger than the second diameter.

4. The magazine according to claim 3, wherein the magazine (2) comprises at third cartridge type (45) provided with a fixed choke (48) having a third diameter, wherein the third diameter is smaller than the first and the second diameter.

5. The magazine according to claim 4, wherein the second countermeasure (41) is adapted to be launched before the first countermeasure (40).

6. The magazine according to claim 5, wherein the third countermeasure (42) is adapted to be launched before the second countermeasure (41).

7. The magazine according to claim 1, wherein the magazine (2) comprises a plurality of cartridges (12), wherein a cartridge comprises an adjustable choke (17) adapted to be set to a desired diameter.

8. The magazine according to claim 7, wherein the adjustable choke (17) comprises a plurality of wedge shaped elements (25) adapted to be moved along a longitudinal direction of the cartridge (12) in order to adjust the diameter of the choke (17).

9. The magazine according to claim 8, wherein a wedge shaped element (25) is moved by an actuator (27) positioned in the recoil plate (8) of a cartridge (12).

10. The magazine according to claim 7, wherein the adjustable choke (17) comprises a sleeve (29) having a conical front portion (31) adapted to be moved along a longitudinal direction of the cartridge (12) in order to adjust the diameter of the choke (17).

11. The magazine according to claim 10, wherein the magazine (2) is adapted to set the adjustable choke (17) of a first cartridge to a first diameter and to set the adjustable choke (17) of a second cartridge to a second diameter, wherein the second diameter is smaller than the first diameter, before the countermeasures are launched.

12. The magazine according to claim 11, wherein the projectiles (11) are spherical or multifaceted and that the diameter of a projectile is in the range between 18 mm.

13. A cartridge (12) adapted to be used in the magazine (2) according to claim 1, wherein the cartridge (12) comprises an adjustable choke (17) adapted to be set to a desired diameter, and wherein the adjustable choke (17) comprises a plurality of wedge shaped elements (25) adapted to be moved along a longitudinal direction of the cartridge (12) in order to adjust the diameter of the choke (17).

14. A method for launching the first countermeasure (40) and the second countermeasure (41) from the magazine (2) of claim 1, the method comprising the steps of launching the first countermeasure (40), and launching the second countermeasure (41).

15. An aircraft comprising at least the one magazine according to claim 1.

16. The magazine according to claim 1, wherein the magazine is mounted on an aircraft.

* * * * *